(12) United States Patent
Plourde

(10) Patent No.: US 11,002,408 B2
(45) Date of Patent: May 11, 2021

(54) DRAINAGE RACK

(71) Applicant: Gino Plourde, St-Fabien (CA)

(72) Inventor: Gino Plourde, St-Fabien (CA)

( * ) Notice: Subject to any disclaimer, the term of this patent is extended or adjusted under 35 U.S.C. 154(b) by 40 days.

(21) Appl. No.: 16/683,448

(22) Filed: Nov. 14, 2019

(65) Prior Publication Data

US 2020/0216301 A1 Jul. 9, 2020

(30) Foreign Application Priority Data

Nov. 19, 2018 (GB) .................................. 1818831

(51) Int. Cl.
*F16N 33/00* (2006.01)
*B67C 11/02* (2006.01)
*F16N 31/00* (2006.01)

(52) U.S. Cl.
CPC ............. *F16N 33/00* (2013.01); *B67C 11/02* (2013.01); *B67C 2011/022* (2013.01); *F16N 31/002* (2013.01)

(58) Field of Classification Search
CPC ........ F16N 33/00; F16N 31/00; F16N 31/002; F16N 31/004; B67C 9/00; B67C 11/02
USPC ..................... 141/364, 106, 86–88
See application file for complete search history.

(56) References Cited

U.S. PATENT DOCUMENTS

| | | | |
|---|---|---|---|
| 637,963 A | * | 11/1899 | Howard .................. F16N 33/00 |
| | | | 141/106 |
| 2,071,944 A | | 2/1937 | Hoffman |
| 2,781,065 A | | 2/1957 | Hofacer |
| 4,832,095 A | | 5/1989 | Bonnell |
| D329,655 S | | 9/1992 | Bonnell |
| 5,269,354 A | | 12/1993 | Koberg |
| 5,325,898 A | | 7/1994 | Forgnone |
| D360,214 S | | 7/1995 | Loudon |
| 5,522,437 A | | 6/1996 | Blackburn |
| 5,540,264 A | | 7/1996 | Harp |
| 5,636,670 A | | 6/1997 | Baker |
| 5,884,676 A | | 3/1999 | Sage |
| 6,405,765 B1 | | 6/2002 | Handrick |
| 6,539,989 B1 | | 4/2003 | Walden |
| 2011/0094622 A1 | | 4/2011 | McLoy |

FOREIGN PATENT DOCUMENTS

FR         2999962 A1 *  6/2014   ............. F16N 33/00

* cited by examiner

*Primary Examiner* — Timothy P. Kelly

(57) ABSTRACT

A rack for supporting containers upside down for drainage. The rack includes container holders for maintaining the containers in a desired orientation during the drainage process.

23 Claims, 4 Drawing Sheets

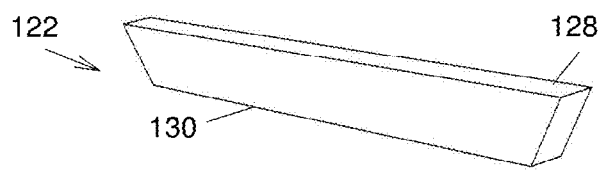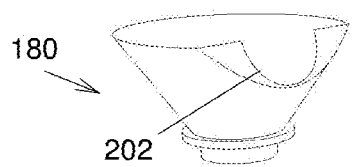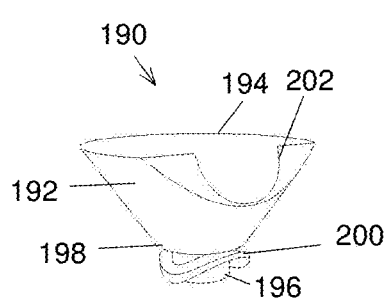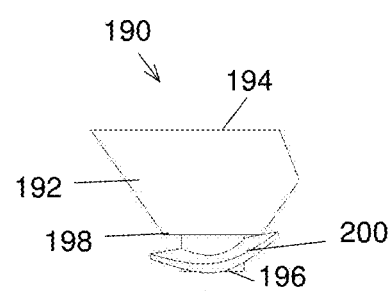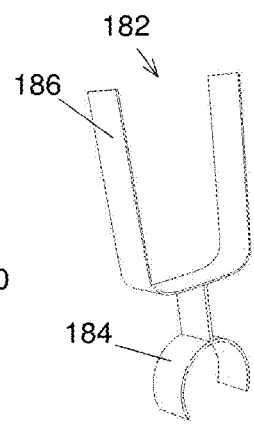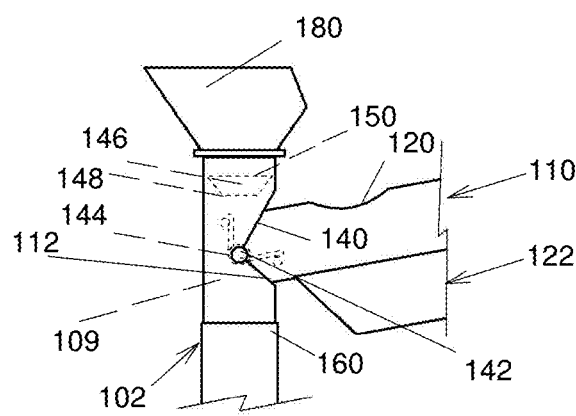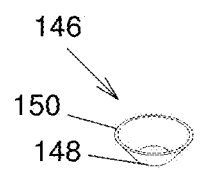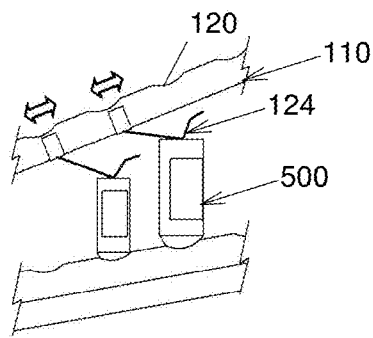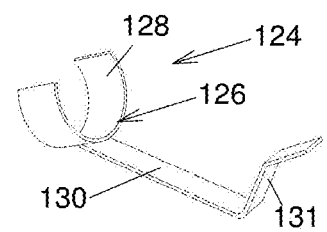

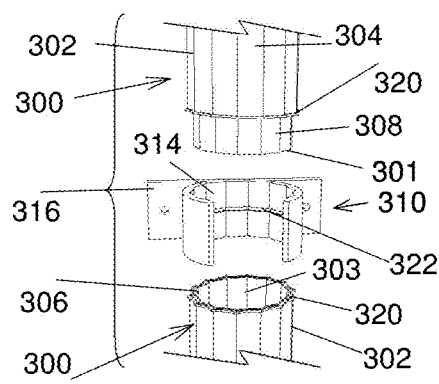
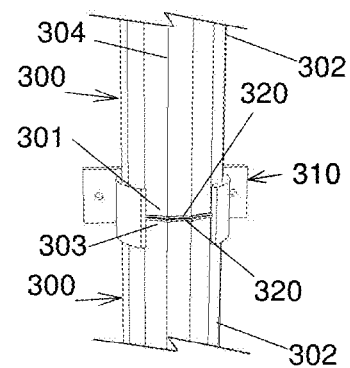
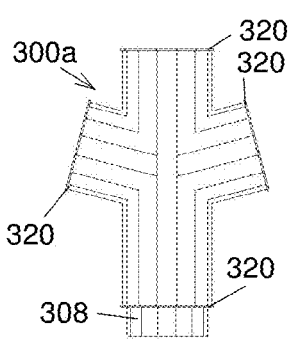
FIG. 18  FIG. 19  FIG. 20
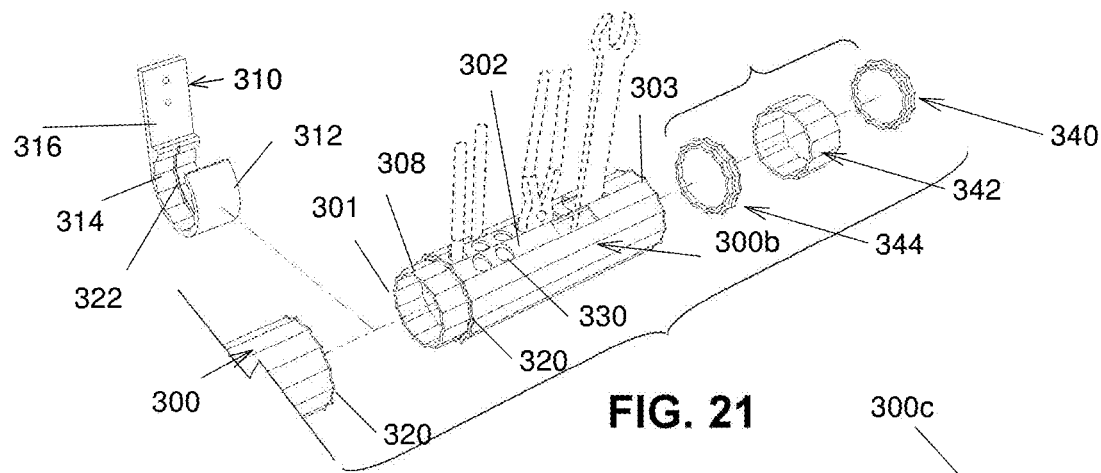
FIG. 21
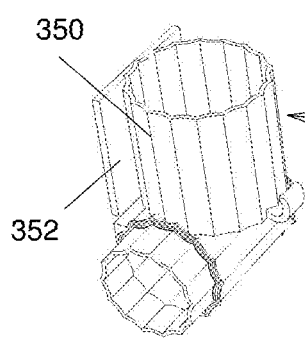
FIG. 22
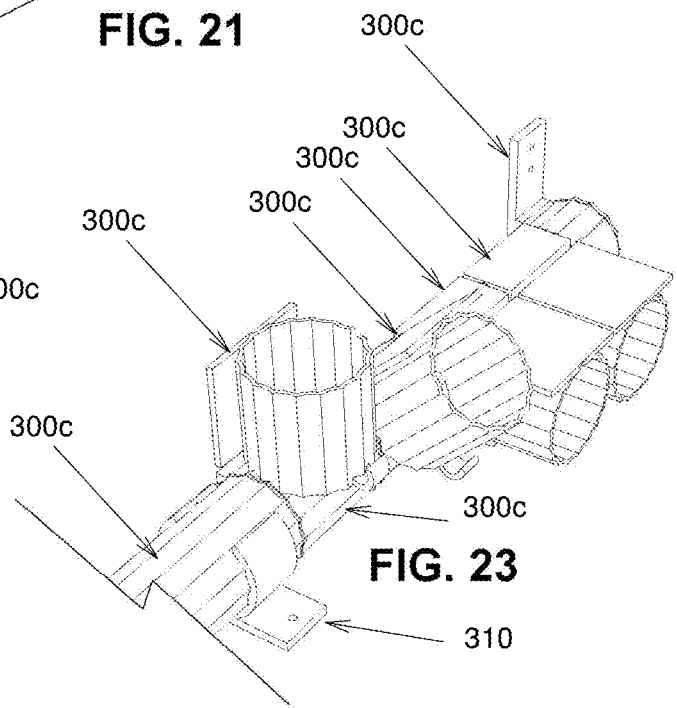
FIG. 23

DRAINAGE RACK

FIELD OF THE INVENTION

The present invention relates to the general field of liquid recovery and is more specifically concerned with a drainage rack.

BACKGROUND

Devices for recovering or draining residual fluids from recently emptied containers and vessels containing viscous fluids, such as motor oil bottles and motor oil filters, among others, are known. Typically, such devices, commonly known as draining stands or racks, generally comprise a plurality of funnel-like elements having their wide inlet end oriented upwardly, and their narrow outlet end extending downwardly into a network of conduits that are joined to a common output port located above the opening of a collecting reservoir or the like that receives the drained fluids from all the containers.

The containers to be drained are positioned upside down into the funnel-like elements and remain there for a sufficient lapse of time to allow the residual viscous fluids to slowly flow down by gravity into the network of conduits and eventually into the collecting reservoir. Currently existing drainage racks however have many disadvantages.

Indeed, the containers positioned upside down into the funnel-like elements are more often than not containers having a substantially rectangular format, with an opening extending upwardly at one upper end thereof, rather than a symmetrical cylindrical container with its centered opening on top. Thus, the containers generally end up resting at an oblique angle relative to the vertical, which results in more time required for draining each container.

The problem is often worsened by the presence of sometimes relatively deep transversal ribs along side surface portions of the containers, as well as a hollow handle formed along an upper corner the container. These handles can define small inner pocket regions in curved portions thereof, particularly adjacent the mouth, or neck finish of the container. This will result in some of the liquids to recover remaining stuck in the container.

Against this background, there exists a need in the industry to provide an improved drainage rack. An object of the present invention is therefore to provide such an improved drainage rack.

SUMMARY OF THE INVENTION

In a broad aspect, there is provided a rack for recovering fluids from a plurality of containers, the containers each defining a container finish, a container peripheral wall extending from the container finish and a container end wall opposed to the container finish, the rack including: a trunk defining a trunk passageway open at a bottom end thereof; first and second branches extending from the trunk in a substantially superposed relationship relative to each other with the second branch above the first branch, each of the first and second branches being substantially elongated and defining a branch proximal end and a substantially opposed branch distal end, the branch distal end being higher than the branch proximal end when the rack is in an operational configuration, the first and second branches extending from the trunk at the branch proximal end, the first branch further defining a branch passageway open at the branch proximal end and leading into the trunk passageway, the first branch defining a plurality of top apertures facing upwardly and leading into the branch passageway; and a container holder secured to the second branch for holding at least one of the containers. In operation, the containers are held in the rack with the container finishes each engaging a respective one of the top apertures and the container holder engaging the at least one of the containers so that the at least one of the containers is maintained in a substantially predetermined orientation. Fluids contained in the containers may be collected through the branch and trunk passageways for discharge at the bottom end.

There may also be provided a rack wherein the container holder is resiliently deformable and configured for engaging the container at the container end wall in a deformed configuration in which the container is biased towards the first branch when the container is held between the first and second branches.

There may also be provided a rack wherein the container holder includes a resiliently compressible material provided at an underside of the second branch.

There may also be provided a rack wherein the container holder includes a holder mounting bracket for mounting the container holder to the second branch and a deformable blade extending from the mounting bracket, the deformable blade defining a blade free end portion opposed to the holder mounting bracket, the blade free end portion being movable relative to the second branch through deformation of the deformable blade.

There may also be provided a rack wherein the holder mounting bracket is movable longitudinally along the second branch.

There may also be provided a rack wherein at least one of the top apertures is delimited by an aperture peripheral wall extending therefrom and protruding from the remainder of the first branch.

There may also be provided a rack wherein the aperture peripheral wall is substantially cylindrical.

There may also be provided a rack wherein the aperture peripheral wall is substantially funnel-shaped.

There may also be provided a rack wherein the aperture peripheral wall defines a notch for receiving part of the container therein.

There may also be provided a rack wherein the first and second branches are substantially parallel to each other.

There may also be provided a rack wherein the trunk includes a telescopic section between the first and second branches.

There may also be provided a rack wherein the second branch is pivotable vertically relative to the trunk.

There may also be provided a rack wherein the second branch is pivotally biased towards the first branch.

There may also be provided a rack wherein the first branch includes a plurality of branch sections, each branch section including a substantially cylindrical main tube terminated at one end thereof by an axial sleeve and at an opposed end thereof by a sleeve receiving aperture, the main tubes each defining a branch passageway section extending between the sleeve and the sleeve receiving aperture, the sleeve of one of the branch sections being inserted in the sleeve receiving aperture of an adjacent one of the branch sections, each branch section also defining at least one of the top apertures leading into the branch passageway section.

There may also be provided a rack wherein the sleeve is externally corrugated and the sleeve receiving aperture is complementarily internally corrugated such that adjacent branch sections are mountable to each other at discrete axial angular relationships relative to each other.

There may also be provided a rack wherein the sleeve and the sleeve receiving aperture are frictionally engaged to each other.

There may also be provided a rack wherein at least one of the branch sections includes a plate extending from the main tube, the at least one of the branch sections being mountable to adjacent ones of the branch sections so that the plate define a shelf.

There may also be provided a rack wherein at least one of the branch sections includes an auxiliary tube extending from the main tube and delimiting the top aperture.

There may also be provided a rack wherein at least one of the branch sections includes a utility section provided with apertures configured for holding tools.

There may also be provided a rack further including a branch mounting bracket defining a mounting plate and a linking element, the linking element defining a first section receiving portion receiving a first one of the branch sections, a second section receiving portion receiving a second one of the branch sections, and a groove extending therebetween, the first and second branch sections each defining a respective ridge at a respective end of its respective main tube, the ridges being inserted in the groove, the sleeve of the first one of the branch sections being engaged in the sleeve receiving aperture of the second one of the branch sections.

There may also be provided a rack further including a container mounted to a distalmost one of the branch sections, the container being axially mounted to the distalmost one of the branch sections ans defining a proximal axial wall blocking separating the container from the branch passageway.

There may also be provided a rack further including an auxiliary fluid drainage element, the auxiliary fluid drainage element including an elongated auxiliary branch having a proximal end thereof mounted to the trunk and an opposed distal end portion thereof extending radially distally therefrom at a predetermined drainage angle relative to the horizontal plane from the trunk, the auxiliary branch defining an auxiliary branch passageway extending longitudinally therealong and being in fluid communication with the trunk passageway; and at least one container drainage unit mounted to the auxiliary branch on an upper portion thereof the auxiliary branch, the container drainage unit including an auxiliary funnel portion having an outlet end thereof in fluid communication with the auxiliary branch passageway, at least one container drainage unit being configured and sized for receiving a motor oil filter.

There may also be provided a rack wherein the substantially predetermined orientation is substantially vertical.

Advantageously, the proposed rack facilitates supporting the containers in a substantially vertical orientation, which facilitates drainage.

The present application claims priority from UK Request for a Patent 1818831.8 filed Nov. 19, 2018, the contents of which is hereby incorporated by reference in its entirety.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 3, in a perspective view, illustrates an embodiment of a container holder part of the rack of FIGS. 1 and 2;

FIG. 4, in a perspective view, illustrates an embodiment of a trunk funnel part of the rack of FIGS. 1 and 2;

FIG. 5, in a perspective view, illustrates an embodiment of a removable funnel element part of the rack of FIGS. 1 and 2;

FIG. 6, in a side elevational view, illustrates the removable funnel element of FIG. 5;

FIG. 7, in a perspective view, illustrates an embodiment of a movable container holder part of the rack of FIGS. 1 and 2;

FIG. 8, in a side partial view, illustrates a pivot arrangement part of the rack of FIGS. 1 and 2;

FIG. 9, in a perspective view, illustrates a frusto-conical funnel member part of the rack of FIGS. 1 and 2;

FIG. 10, in a side partial view, illustrates another embodiment of a container holder usable in the rack of FIGS. 1 and 2, according to the present invention, here showing two such container holders slidably engaged along a longitudinal underside portion of a branch part of the rack of FIGS. 1 and 2.

FIG. 11, in a perspective view, illustrates the container holder in FIG. 10;

FIG. 18, in a perspective exploded view, illustrates a support junction arrangement between modular conduits;

FIG. 19, in a perspective view, illustrates the support junction arrangement of FIG. 18, here shown in an assembled state;

FIG. 20, in a side elevational view, illustrates a modular conduit usable as a vertically extending trunk of an alternative rack;

FIG. 21, in a perspective exploded view, illustrates a support junction arrangement between branch sections part of an alternative rack, one of the branch sections being adapted for receiving hand tools and small items;

FIG. 22, in a perspective view, illustrates a branch section of FIG. 21; and FIG. 23, in a perspective view, illustrates a plurality of branch sections of FIG. 22 secured to each other in one of many possible configurations.

DETAILED DESCRIPTION

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention.

Figure 1:
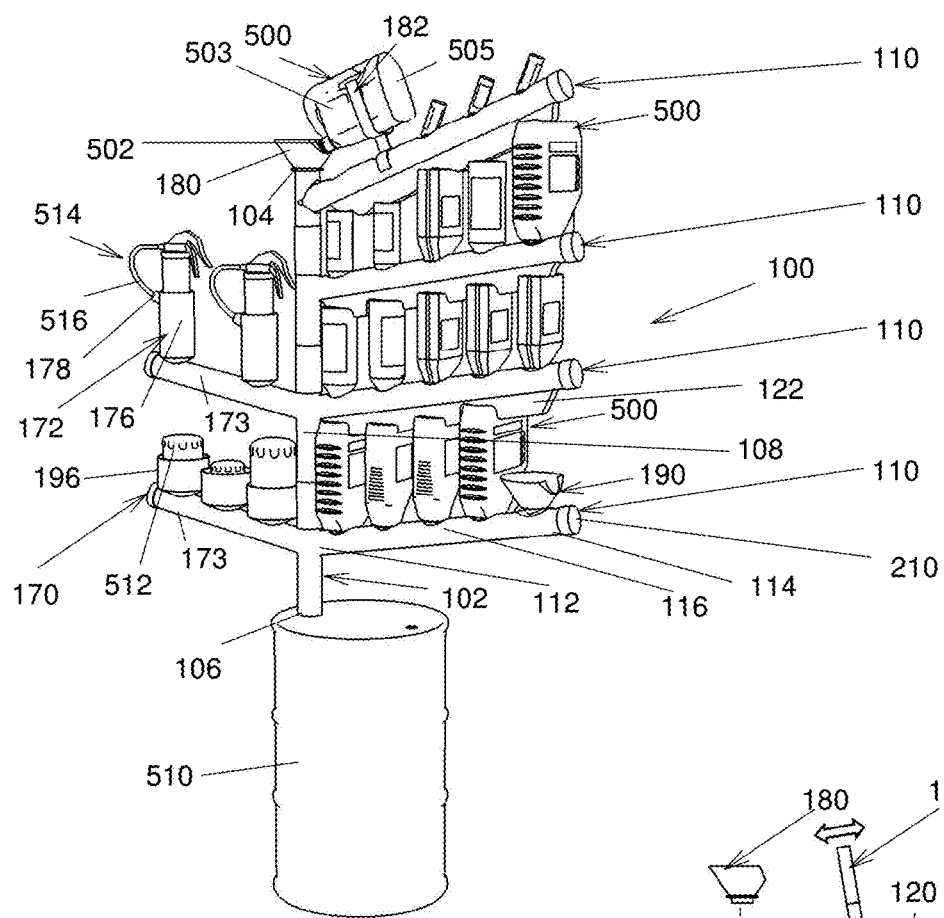
FIG. 1, in a perspective environmental view, illustrates an embodiment of a rack usable for recovering residual fluids from containers, according to the present invention, here shown recovering fluids from motor oil bottles, motor oil filters and grease guns, and directing the recovered fluids in a collecting reservoir at the bottom of the figure.
Figure 2:
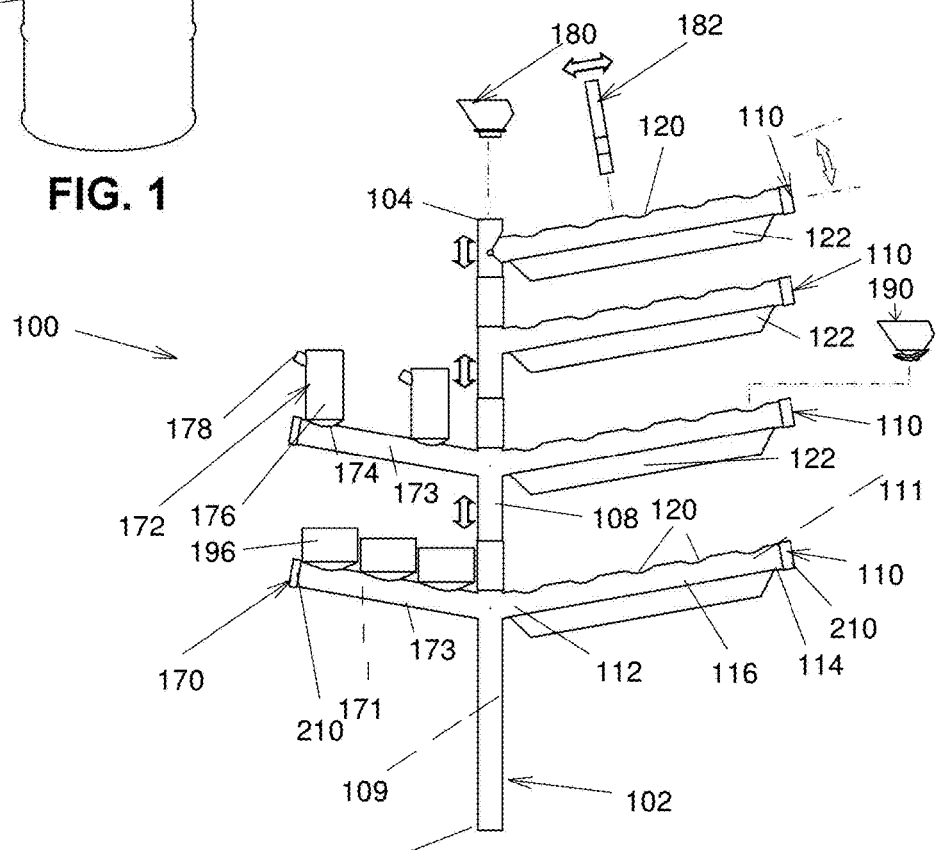
FIG. 2, in a front elevational view, illustrates the rack shown in FIG. 1, here shown without the containers and collecting reservoir.
Figure 12:
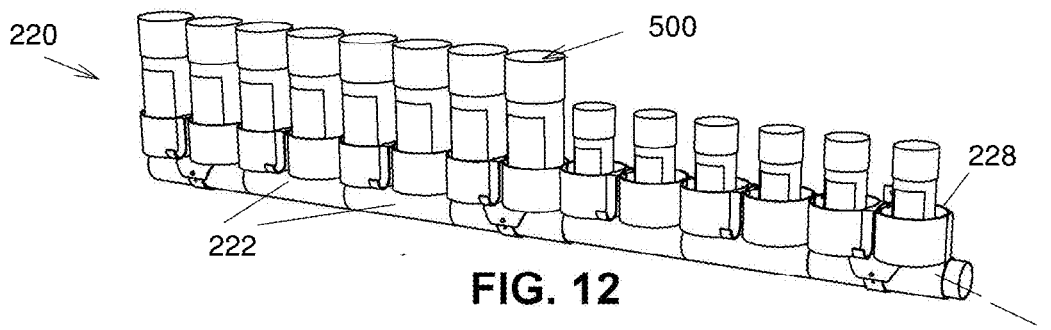
FIG. 12, in a perspective view, illustrates an embodiment, according to the present invention, of an assembly of a plurality of auxiliary support elements.

Referring to FIGS. 1 and 2, there is illustrated various aspects of an embodiment of a rack 100 usable for recovering residual fluids from a plurality of containers 500. The containers 500 each define a container finish 502, a container peripheral wall 503 extending from the container finish 502 and a container end wall 505 opposed to the container finish 502. The rack 100 may be securable to a support structure or may be securable to collecting reservoir 510 so that is stands on its own above the collecting reservoir 510.

The rack 100 comprises a trunk 102. The trunk 102 has an elongated tubular configuration, and defines a trunk top end 104, a trunk bottom end 106, a trunk intermediate portion 108 extending therebetween, and a trunk passageway 109 extending longitudinally throughout. The trunk passageway is open at the trunk bottom end 106. The trunk 102 is typically substantially vertical, but trunks 102 having any other suitable orientation are also usable.

The rack 100 further comprises at least two branches 110. Each branch 110 has an elongated tubular configuration and defines a branch proximal end 112, a branch distal end 114, a branch intermediate portion 116 extending longitudinally there between, and a branch passageway 111 extending longitudinally throughout. The branch distal end 114 is higher than the branch proximal end 112 when the rack 100 is in an operational configuration.

Each branch 110 is mounted to the trunk 102 at its respective branch proximal end 112. The branches 110 form one or more groups of branches that are in a substantially superposed relationship relative to each other, vertically spaced apart from each other. For example, the branches 110 within each group have their respective branch intermediate portions 116 extending radially outwardly and substantially parallelly therefrom at a predetermined angle relative to the horizontal. The branch passageways 111 are open at the branch proximal end 112 and lead into the trunk passageway 109

Furthermore, at least one of the branches 110, and typically all the branches 110, defines a plurality of top apertures 120 (better seen in FIG. 2) facing upwardly and leading into the branch passageway 111. The top apertures 120 are in a longitudinally spaced apart relationship relative to one another along a longitudinal upper side portion of the branches 110. Each one of the top apertures 120 is configured and sized for removably engaging the neck finish 502 of a bottle-type container 500 to be drained having a predetermined neck finish diameter. The neck finish 502 of a bottle-type container 500 is typically threaded for engaging a threaded cap (not shown in the figures), and is terminated with the opening, or mouth of the container 500. As the branch passageway 111 is in fluid communication with the trunk passageway 109, a gravity fluid drainage system of passageways is defined, extending from each one of the top apertures 120 to the opening formed in the trunk passageway 109 at the trunk bottom end 106.

At least one container holder 122 is secured to one of the branches 110 located adjacent above another one the the branches 110. In operation, the containers 500 are held in the rack 100 with the container finishes 502 each engaging a respective one of the top apertures 120 and the container holder 522 engages the at least one of the containers 500 so that the at least one of the containers 500 is maintained substantially vertical between two adjacent superposed branches 110.

The container holder 522 is resiliently deformable and configured for engaging the container 500 at the container end wall 505 in a deformed configuration in which the container finish 502 is biased towards the branch 110 in which the container finish 502 is engaged. FIG. 3 illustrates a non-limiting example of a container holders 122. Each one of the at least one container holder 122 includes a container holder proximal portion 128 secured to a respective longitudinal underside portion of the branch 110 located above the container 500 to hold, and a container holder distal portion 130 extending generally downwardly therefrom. The container holder distal portion 130 is configured and arranged for user adjustably and removably engage the container 500 and the container end wall 505 so that the container 500 to be drained is oriented substantially upside down with its neck finish 502 removably engaged in a respective one of the top apertures 120 of the branch 110 located adjacently underneath.

Thus, with the at least one container 500 to be drained oriented substantially upside down between a respective container holder 122 and a respective top aperture 120, the user may manually adjust the angle of the container 500 by moving the container end wall 505 thereof relative to the respective container holder distal portion 130 such that the container 500 is at an optimal angle for efficiently draining substantially all the fluid contained therein, with the drained fluids directed to the trunk bottom end 104 of the rack 100, where it can be collected in any suitable collecting reservoir 510, as illustrated, a fluid conduit network, or the likes.

For example, and non-limitingly, in some embodiments of the invention, the number of branches 110 is between three (3) and six (6), the number of top apertures 120 within each branch 110 is between one (1) and twenty (20), each having a diameter of between ¾ of an inch and two (2) inches. Also, for example and non-limitingly, the predetermined drainage angle of each branch 110 is between one and 45 degree above the horizontal, for example about five (5) degree above the horizontal.

Referring to FIGS. 1 to 3 inclusively, in some embodiments of the invention, each one of the at least one container holder 122 is made of a substantially flexible, yet, shape resiliently compressible material provided at an underside of the branch 110 to which it is mounted. In such embodiments, the container end wall 505 of the container 500 is removably and adjustably engageable with the container holder distal portion 130 by pushing the flexible material thereof sufficiently upwardly using typically two or more fingers of the hand so as to achieve a user desired positioning of the bottom of the container 500 thereunder, and resiliently engaging the container 500 at the desired position by releasing the resiliently flexible material on the container 500. Hence the container 500 is thus held at a user desired angle relative to a horizontal for an optimized drainage thereof.

In some embodiments, as best illustrated in FIG. 3, the container holder 122 consists in a single elongated block of a resiliently flexible foam-like material extending substantially the whole longitudinal underside surface of the branch 110. In some other embodiments, the number container holders 122 made of a resilient flexible foam-like material is corresponding to the number of top apertures in 120 provided in the branch below the container holders 122.

Referring to FIGS. 10 and 11, in some other embodiments of the invention, the container holder proximal portion 128 of an alternative container holder 126 takes the form of a clip-like holder mounting bracket configured and arranged for engaging a longitudinal underside portion of the branch 110. A non-limiting example of such a holder mounting bracket would be a C-clip. In some embodiments, the container holder proximal portion 128 is movable along the branch 110, for example by being longitudinally slidably movable therealong.

Furthermore, the container holder distal portion 130 takes the form of a substantially rigid, yet, resiliently deformable blade extending from the container holder proximal portion 128 at a longitudinal oblique angle away from the longitudinal underside portion of the branch 110. Furthermore, the container holder distal portion 130 includes a blade free end portion 131 opposed to the holder proximal portion and configured and arranged for abuttingly engaging in a spring biased fashion a user selected underside surface portion of the container 500 to be drained. The blade free end portion 131 is movable relative to the second branch through deformation of the deformable blade 130.

Thus the container holder 126 is user selectively slidably movable along the longitudinal underside portion of the branch 110, so as to have its blade free end portion 131 positioned substantially vertically in register with the underside surface of the container 500. Hence, the user may abut the blade free end portion 131 on a selected portion thereof so as to hold the container 500 at a desired angle relative to the vertical plane for an optimized drainage.

In some embodiments, the blade free end portion 131 has its contacting surface portion with the container 500 covered with rubber-like resilient material for a better grip there with. Also, in some embodiments, the number of container holders 122 is corresponding to the number of top apertures 120 defined along the branch 110 located adjacently underneath thereof.

In some embodiments, the container holder distal portion 130 extends distally from the longitudinal underside portion of the branch 110 a distance of between 5 and 75 percent of the total distance between the respective adjacent branches 110. For example, the container holder distal portion 130 extends distally from the longitudinal underside surface of the branch 110 a distance of roughly thirty (30) percent of the total distance between the adjacent branches 110. In some other embodiments, the container holder distal portion 130 extends distally from the longitudinal underside portion of the branch 110 a sufficient distance for resiliently engaging largely available commercial sizes and format of containers 500 such as 500 milliliters (ml), 940 milliliters (ml), 1 liter, 3.785 liters, 4 liters, 32 us oz. (1 us quart or 0.25 gallon), and 1 us gallon, 5 quarts (1.25 gallon).

In some embodiments of the invention, the trunk 102 has cross-section dimension that is at least slightly greater than the cross-section dimension of each one of the branches 110. Also, in some embodiments, at least one branch 110 among the branches 110 has its branch proximal end 112 vertically pivotally mounted to the trunk 102 through a pivot arrangement, so as to allow the branch 110 to pivot between a first angle relative to the horizontal, and a second angle relative to the horizontal that is at least slightly greater than the first angle.

Thus, containers 500 to be drained having a relative large difference of height dimension relative to one another may all have their container finish 502 engaged in a respective top aperture 120 of a non pivotable branch 110, and their container end wall 505 engaged with a respective container holder distal portion 130 of a pivotable branch 110 located adjacently above thereof. Furthermore, the shortest container 500 may occupy a position closest to the trunk 102 while the tallest container may occupy a position that is the farthest away relative to the trunk 102. Advantageously the at least one branch 110 thus pivotable allows the drainage of containers 500 having a significantly wide range of height dimensions between them, when compared to containers 500 engaged between adjacent branches 110 having each a fixed angle relative to the horizontal plane. In some embodiments, the at least one branch 110 being pivotable is only the uppermost branch 110 among the branches 110. For example, the first angle is roughly equivalent to the predetermined drainage angle, and the second angle is roughly twenty five (25) degree greater than the predetermined drainage angle.

Referring to FIG. 8, in some embodiments, the pivot arrangement includes a trunk side aperture 140 sufficiently sized and shaped for freely receiving therein the branch proximal end 112 of the branch 110 and allowing the latter a pivot movement thereof between the first and second angle. The pivot arrangement further includes a pivot pin 142 extending transversally through, and pivotably engaging, the trunk 102 with the branch proximal end 112, and, in some embodiments, a spring arrangement 144 configured for springbiasingly applying a downward force on the pivotable branch 110 so that the pivotable branch 110 is pivotally biased towards the branch 110 located below.

Also, in some embodiments, a frusto-conical funnel member 146 is located inside the trunk 102 and proximally above the trunk side aperture 140. The frusto-conical funnel member 146 has its wide inlet end 148 coaxially sealably engaged along the inner tubular surface of the trunk 102, and its narrow outlet end 150 extending downwardly so as to direct any fluid flowing down along the inner tubular surface of the trunk 102 towards the center thereof so as to prevent any fluid leaks along the trunk side aperture 140.

Referring more particularly to FIG. 2, in some embodiments of the invention, the trunk 102 further includes a longitudinal telescopic section 160 located between at least two vertically adjacent branches 110 among the branches 110, so as to allow a user to selectively adjust the vertical distance between the two adjacent branches 110. Thus, sub-groups of containers 500 to be drained having similar height dimensions on average may be engaged between pairs of adjacent branches 110 having the intermediate distance between them custom adjusted at an optimized distance for facilitating the engagement and removal of the containers 500.

Referring to FIGS. 1 and 2, in some embodiments of the invention, the rack 100 further comprises at least one auxiliary fluid drainage element 170, each including an elongated auxiliary branch 173 having a proximal end connected to a longitudinal side portion of the trunk 102, an opposed distal end portion extending radially distally therefrom at the predetermined drainage angle relative to the horizontal plane, and an auxiliary branch fluid passageway 171 extending longitudinally throughout and in fluid communication with the trunk passageway 109. The at least one auxiliary fluid drainage element 170 further includes at least one container drainage unit 172 connected in a spaced apart relationship along a longitudinal upper side portion of the auxiliary branch 173.

The container drainage unit 172 includes an auxiliary funnel portion 174 having its narrow outlet end in fluid communication with the auxiliary branch fluid passageway 171, and an open ended auxiliary tubular member 176 extending substantially vertically upwardly from the wide inlet end of the auxiliary funnel portion 174.

In some embodiments of the auxiliary fluid drainage element 170, the auxiliary tubular member 176 is configured and sized for freely receiving therein a container-type motor oil filter 512 having its opening end oriented downwardly for draining residual oil therefrom. Also, in some other embodiments of the auxiliary fluid drainage element 170, the auxiliary tubular member 176 is configured and sized for freely receiving therein the typically elongated grease reservoir of a trigger pump grease gun 514, and further defines a nozzle receiving port 178 along a side surface portion thereof that is in fluid communication with the interior of the auxiliary tubular member 176. Thus, as illustrated in FIG. 1, with the grease gun nozzle at the end of a flexible nozzle extension conduit 516 of the grease gun inserted in the nozzle receiving port 178, and the grease reservoir inserted in the auxiliary tubular member 176, any grease dropping or oozing from these parts of the grease gun 514 may be directed towards the trunk lower end 106 of the rack 100.

Referring to FIGS. 1, 2 and 7, in some embodiments, the rack 100 further comprises a trunk funnel 180 connected on top of the trunk top end 104, with its narrow outlet end in fluid communication with the trunk passageway 109 and its wide inlet end oriented vertically upwardly thereof.

The rack 100 further comprises in some embodiments a movable container holder 182. The movable container holder 182 includes a support bracket clip member 184 configured and arranged for longitudinally and user selectively slidably engaging a longitudinal upper side portion of the uppermost branch 110. The movable container holder 182 further includes a U-shaped bracket 186 having its lower apex portion connected to an upper portion of the support bracket clip member 184 and its arms extending substantially upwardly distally therefrom. The U-shaped bracket 186 is configured and sized for removably engaging in a snug fit relation opposed side wall surfaces of a relatively large container 500 to be drained such that the container neck 502 of the container 500 is oriented substantially parallelly relative to the respective branch 110 and towards the trunk funnel 180. Thus, with the relatively large container 500 engaged in the U-shaped bracket 186, the container finish 502 may be positioned substantially above the inlet port of the trunk funnel 180 for draining fluid from the container 500.

Referring to FIGS. 1, 2, 5 and 6, in some embodiments, the rack 100 further comprises a removable funnel element 190. The removable funnel element 190 includes a funnel member 192 having its wide inlet end 194 extending substantially vertically upwardly, and a tubular member 196 extending substantially downwardly from the narrow outlet end 198 of the funnel member 192 and having a cross-sectional diameter compatibly configured and sized for freely engaging a respective one of the least one top aperture 120. The removable funnel element 190 further includes an annular member 200 coaxially connected at the junction between the funnel member 192 and the tubular member 196. The annular member 200 is configured and sized so as to stably support the removable funnel element 190 on the angled surface of the branch 110 surrounding the top aperture 120 such that the wide inlet end 194 extends substantially vertically upwardly relative thereto.

Thus, a user may engage the removable funnel element 190 in any selected top aperture 120 of his or her preference for allowing to manually position the opening of a container 500 above the wide inlet end of the funnel member 192 and empty the fluid content thereof in the rack 100.

Thus, the top apertures 120 are delimited by an aperture peripheral wall extending therefrom and protruding from the remainder of the first branch. The aperture peripheral wall may be substantially cylindrical or substantially funnel-shaped, among other possibilities.

In some embodiments, each branch 110 and auxiliary branch 173 has its respective distal open end relative to the trunk 102 that is closed with an end cap 210, but in other embodiment, the end cap is omitted.

As illustrated in FIGS. 1, 4 and 5, in some embodiments, the trunk funnel 180 and the removable funnel element 190 each have a funnel recess 202 extending inwardly relative to a peripheral edge portion the wide inlet end 194 (as best illustrated in FIG. 5) of their respective funnel. The funnel recess 202 is configured and sized for freely, yet substantially stably engaging therein a lower peripheral surface portion of the container finish 502 of a container 500.

In some embodiments, the trunk bottom end 104 is provided with a valve (not shown in the figures) for allowing a user to selectively stop the downpour of drained fluid therefrom, so as to allow the replacement of the collecting reservoir 510 when full. In some embodiments, the trunk bottom end 104 further includes a rotatable threaded coupler (not shown in the figures) for threadedly sealably engaging a threaded inlet port of the collecting reservoir 510 standing upright underneath the rack 100. Thus, a collecting reservoir 510 having a sufficient weight when empty may be used as a support structure to maintain the rack 100 in an upright position although the latter is loaded to maximum capacity with substantially empty containers 500 to be drained.

Alternatively for support, the rack 100 may be attached to a suitable stationary support structure that leaves sufficient space for a user to manually engage and retrieve containers 500 between superposed branches 110 of the rack 100. For example, using suitable U-brackets (not shown in the figures), the rack 100 may have spaced apart cross-sectional portions of its trunk 102 attached along a support wall, or to a positive or negative corner of a support wall, wherein the branches 110 are sufficiently angularly positioned away from the wall. Still alternatively for support of the rack 100, a bottom portion of the trunk 102 may be secured to a support structure resting on a floor such as, for example, to a top portion of a table-size open frame (not shown in the figures) configured for freely positioning the mouth or inlet port of a relatively large fluid collecting reservoir 510 in register under the trunk lower end 106.

Referring to FIGS. 12 to 17 inclusively, in some embodiments of the invention, the rack 100 further comprises at least one auxiliary support element 220 usable for supporting various containers and tools closely associated with work contexts generating containers 500 to be drained.

Each auxiliary support element 220 includes a cylindrical support tube member 222 having a tube member first end 224 and a tube member second end 226, wherein the tube member first end 224 includes a diametrically smaller tube portion extending longitudinally distally relative to the support tube member 222, and which is configured for coaxially and resiliently engaging in a snug fit relation an inner peripheral edge portion of the tube member second end 226 of another support tube member 222, so as to cooperatively form a further elongated tube therewith.

Each auxiliary support element 220 further includes for example two (2) open ended tubular support members 228 having one end connected in a parallelly side-by-side relation along a longitudinal side portion of the support tube member 222, with their combined side-by-side diameters extending substantially the whole longitudinal distance between the tube member first and second end 224 and 226 respectively.

Figure 14:
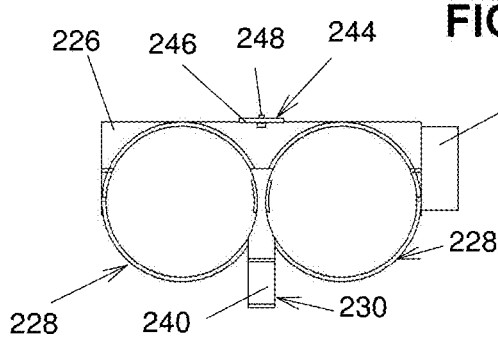
FIG. 14, in top plan view, illustrates an auxiliary support element.
Figure 15:
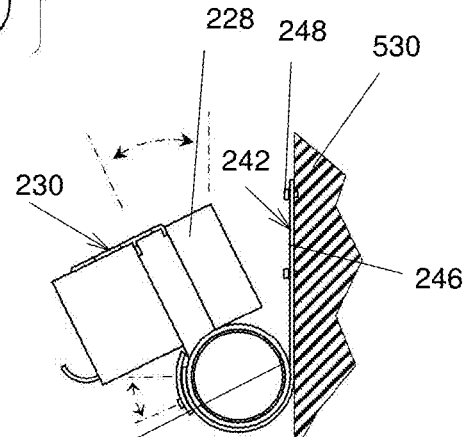
FIG. 15, in a side plan view, illustrates an auxiliary support element, here shown mounted to a support structure.

Furthermore, as best illustrated in FIGS. 14 and 15, a central longitudinal axis of each tubular support member 228 is perpendicularly offset relative to the longitudinal central axis of the support tube member 222 such that a longitudinal surface portion of each tubular member is substantially perpendicularly in register with a longitudinal side surface of the support tube member 222.

For example, each tubular support member 228 is dimensioned for removably receiving therein the lower cylindrical portion of containers 500 such as, for example, lubricant spray cans, grease cartridges, gasket caulk cartridges, and the likes.

Figure 13:
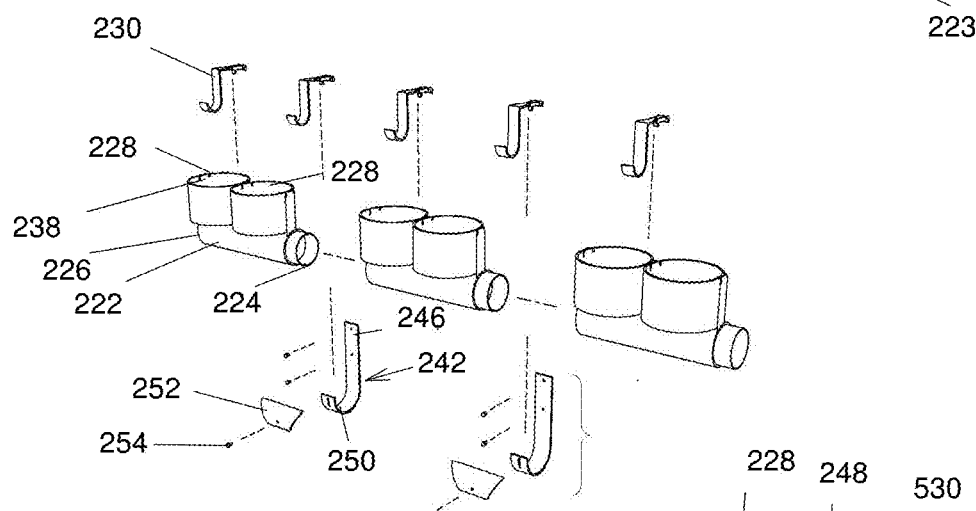
FIG. 13, in a perspective exploded view, illustrates three auxiliary support elements.
Figure 16:
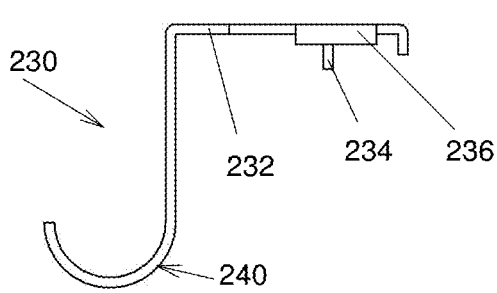
FIG. 16, in a side elevational view, illustrates a J-shaped connector bracket.
Figure 17:
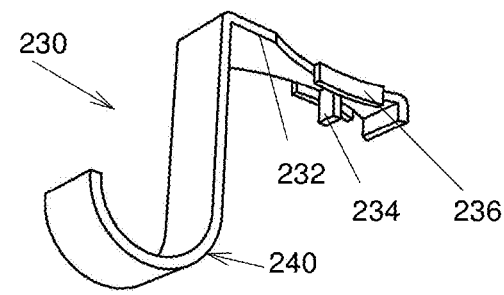
FIG. 17, in a perspective view, illustrates the J-shaped connector bracket of FIG. 16.

Referring more particularly to FIGS. 13, 16 and 17, each auxiliary support element 220 further includes a substantially J-shaped connector bracket 230 having a connector bracket upper portion 232 suitably configured and arranged for resiliently engaging in a snap fit relation the upper peripheral edge portion of two adjacent the tubular support members 228 of two auxiliary support element 220, so as to secure the assembly of their respective support tube members 222 longitudinally coaxially engaged to one another. The connector bracket upper portion 232 includes keyed members 234 and U-shaped lateral portions 236 engageable in compatibly shaped and sized recesses 238 along selected upper edge portions of each adjacent tubular support member 228.

Thus, a plurality of auxiliary support element 220 may be assembled and secured to one another in an end-to-end fashion, with their support tube member 222 cooperatively forming a drainage fluid passageway 223 extending longitudinally therein.

A connector bracket lower portion 240 of the J-shaped connector bracket 230 extends laterally and downwardly relative to the support tube member 222 which may be conveniently used as a general purpose hook member for hanging tools, bags and the like.

Referring more particularly to FIGS. 13 and 15, the at least one auxiliary support element 220 includes at least two auxiliary attachment elements 242. Each attachment element 242 includes takes the form of a J-shaped support bracket having an upper vertical portion 246 configured for attachment to a vertical support structure 530 such as a wall using, for example, suitable screws 248.

The attachment element 242 further includes a lower upwardly rounded portion 250 configured and sized for conforming to, and freely engaging a lower peripheral cross-section of the cylindrically shaped support tube member 222.

The at least one auxiliary support element 220 further includes a stop member 252 user selectively attachable at a suitable location along a distal end portion of the rounded portion 250 using a screw 254 or the like, such that the tubular support members 228 may be oriented at a preferred upward angle away from the support structure 530.

In some embodiments of the at least one auxiliary support element 220, the lower end of each tubular support members 228 form a sealed fluid communication with the drainage fluid passageway 223 of the corresponding support tube member 222. Furthermore, one end of a support tube member 222 in at least one auxiliary support element 220 is connected to the trunk 102, with the drainage fluid passageway 223 thereof being in fluid communication with the trunk passageway 109. Furthermore, the at least one auxiliary support element 220 is attached to the support structure so as to longitudinally lean towards the trunk 102 at a fluid drainage angle of between 0.5 and 5 degree.

Referring to FIGS. 18 to 23 inclusively, in some embodiments, the rack 100 may be modular and the trunk and branches may be made respectively of trunk and branches sections 300, 300a and 300b are assemblable to form at least portions of the trunk 102 and the branches 110 respectively.

Referring for example to FIG. 18, each one in the plurality of trunk and branches sections 300 includes a substantially cylindrical main tube 302 having opposed outer and an inner surface 304 and 306 respectively. Furthermore, each trunk and branches sections 300 includes one engaging end 301 and at least one receiving end 303. For example, the engaging end 301 takes the form of an axial sleeve 308 terminating the main tube 302, and the receiving end 303 defines a sleeve receiving aperture.

In other words, the engaging end 301 includes an engaging tubular portion 308 extending longitudinally distally from the main tube 302. The inner surface 306 of the receiving end 303 is configured and sized for coaxially slidably engaging in a snug fit relation the engaging tubular portion 308 of another trunk or branch section 300. Thus, a plurality of trunk and branches sections 300 may be engaged to one another in a substantially daisy chain fashion to cooperatively form a tree-like structure of trunk and branch sections 300 that is substantially similar to the one illustrated in FIGS. 1 and 2. The main tube 302 is hollow and defines therefore a section of the branch or trunk passageway. In such embodiments, the trunk 102 and branches 110 therefore have the same diameter.

In some embodiments, the outer surface 304 and inner surface 306 each further define corresponding ridges and grooves, respectively, which are extending equidistantly parallelly and longitudinally throughout the length of the main tube 302. Furthermore, the outer surface of the engaging tubular portion 308 also defines equidistantly parallelly extending ridges that compatibly conforms to the inner surface 306 of the receiving end 303 of the main tube 302. In other words, the trunk and branch sections 300 are externally and internally corrugated such that adjacent branch or trunk sections 300 are mountable to each other at discrete axial angular relationships relative to each other.

Referring to FIGS. 18, 19, 21, and 23, the rack 100 further comprises at least one modular support bracket 310. Each one of the at least one modular support bracket 310 includes a C-shaped portion 312 defining an inner surface 314 configured for engaging in a snug fit relation a circumferential portion of the outer surface 304 of the main tube 302, including the parallel ridges there along.

Furthermore, each of the at least one modular support bracket 310 further includes a surface mount portion 316 extending from an outer surface of the C-shaped portion 312, and configured for fastening the modular support bracket 310 to a support structure of the rack 100.

As illustrated in FIG. 21, the surface mount portion 316 may extend adjacently relative to one end the C-shaped portion 312 such that the modular support bracket 310 defines a substantially J-shaped configuration. Alternatively, as best illustrated in FIG. 18, the surface mount portion 316 may extend tangentially and centrally relative to an intermediate outer edge of the C-shaped portion 312.

In some embodiments of the rack 100, each trunk and branch section 300 further includes a relatively low profile annular ridge 320 protruding around each one of the engaging and receiving ends 301 and 303 of the main tube 302. Furthermore, as best illustrated in FIGS. 18 and 21, the modular support bracket 310 further defines a groove 322 along the inner circumference of the inner surface 314 of the C-shaped portion 312. The groove 322 is configured and sized to engage a pair of parallelly abutting annular ridges 320 of two adjacently assembled trunk and branch sections 300.

Thus, each modular support bracket 310 simultaneously preserves the assembly and angular relationship at the junction between two assembled trunk and branch sections 300, as best illustrated in FIG. 19.

Selected trunk and branch sections 300b may define one or more top aperture 120, as exemplified in FIGS. 2, 8 and 10, and/or may define variously sized apertures 330 configured for receiving relatively small objects and hand tools commonly used, for example, in vehicle motor maintenance, and therefore forms a utility section. Examples of such tools may be a wrench, a pair of pliers, pens, and the likes. Such trunk and branch sections 300b capable of receiving hand tools can be advantageously mounted at the free end of a branch 110 where no oil or grease residue is drained within the conduit.

Referring to FIG. 20, it is to be understood that the modular conduit 300 representing the vertically extending trunk 102 may include at least one pivot arrangement as illustrated in FIG. 8, for engaging laterally extending branch sections 300 representing the branches 110 in FIGS. 1 and 2.

Still referring to FIG. 21, in some embodiments of the invention, the end cap 210 may include a modular end cap 340, a tubular segment 342 and an intermediate end cap 344 that are engageable to one another and to the receiving end 303 of a modular conduit 300 for cooperatively forming a removable storage compartment within the tubular segment 342. This storage compartment may be conveniently used for storing small important parts related, for example, to vehicle motor maintenance or the like. The storage compartment is therefore a container mounted to a distalmost one of the branch sections 300, the container being axially mounted to the distalmost one of the branch sections 300 and defining a proximal axial wall, one of the intermediate end cap 344, blocking separating the container from the branch passageway.

Referring to FIGS. 22 and 23, in some embodiments of the invention, the modular conduit 300 may include a container drainage unit 350 in the form of an auxiliary tube extending from the main tube 302 and delimiting the top aperture 120 (not show in FIG. 22). In some embodiments of a modular conduit 300a, a support plate member 352 extending substantially tangentially relative to a lateral longitudinal side of the container drainage unit 350, and in register with a longitudinal side of the main tube 302. The container drainage unit 350 may be further provided with a utility hook 356.

The modular conduit 300 thus provided with the container drainage unit 350 having a support plate member 352 may be usable for draining a container, as illustrated in FIG. 1 and, alternatively, as an angularly adjustable support shelf.

It is to be noted that an assembly closely similar to the one illustrated in FIG. 22 may be used as a stand alone shelves system that can be fastened to a wall surface, or simply resting on a table top. Such a stand alone shelves system may be usable for conveniently stowing at hands reach various household or home garage items.

Advantageously, the rack 100 including major portions thereof composed of trunk and branch sections 300 can be packaged in a disassembled state in a relatively small parcel box. Thus, significantly lower storage and shipping costs may be achieved, compared to the assembly in FIGS. 1 and 2.

The various components of the rack 100 may be made of any substantially rigid material, or combination of materials such as, but not limited to, PVC, ABS, aluminum, steel, a suitable alloy, a plastic composite, and the likes.

Advantageously, the rack 100 may be economically assembled using stock tubing elements such as elongated tubes, Y-junctions, and the likes. Assembly may be made through friction between the components of the rack 100, snap fit or with the use of adhesives and fasteners.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A rack for recovering fluids from a plurality of containers, the containers each defining a container finish, a container peripheral wall extending from the container finish and a container end wall opposed to the container finish, the rack comprising:
    a trunk defining a trunk passageway open at a bottom end thereof;
    first and second branches extending from the trunk in a substantially superposed relationship relative to each other with the second branch above the first branch, each of the first and second branches being substantially elongated and defining a branch proximal end and a substantially opposed branch distal end, the branch distal end being higher than the branch proximal end when the rack is in an operational configuration, the first and second branches extending from the trunk at the branch proximal end, the first branch further defining a branch passageway open at the branch proximal end and leading into the trunk passageway, the first branch defining a plurality of top apertures facing upwardly and leading into the branch passageway;
    and a container holder secured to the second branch for holding at least one of the containers;
    wherein, in operation, the containers are held in the rack with the container finishes each engaging a respective one of the top apertures and the container holder engaging the at least one of the containers so that the at least one of the containers is maintained in a substantially predetermined orientation;
    whereby fluids contained in the containers may be collected through the branch and trunk passageways for discharge at the bottom end.

2. The rack as defined in claim 1, wherein the container holder is resiliently deformable and configured for engaging the container at the container end wall in a deformed configuration in which the container is biased towards the first branch when the container is held between the first and second branches.

3. The rack as defines in claim 2, wherein the container holder includes a resiliently compressible material provided at an underside of the second branch.

4. The rack as defined in claim 1, wherein the container holder includes a holder mounting bracket for mounting the container holder to the second branch and a deformable blade extending from the mounting bracket, the deformable blade defining a blade free end portion opposed to the holder mounting bracket, the blade free end portion being movable relative to the second branch through deformation of the deformable blade.

5. The rack as defined in claim 4, wherein the holder mounting bracket is movable longitudinally along the second branch.

6. The rack as defined in claim 1, wherein at least one of the top apertures is delimited by an aperture peripheral wall extending therefrom and protruding from a remainder of the first branch.

7. The rack as defined in claim 6, wherein the aperture peripheral wall is substantially cylindrical.

8. The rack as defined in claim 6, wherein the aperture peripheral wall is substantially funnel-shaped.

9. The rack as defined in claim 8, wherein the aperture peripheral wall defines a notch for receiving part of the container therein.

10. The rack as defined in claim 1, wherein the first and second branches are substantially parallel to each other.

11. The rack as defined in claim 1, wherein the trunk includes a telescopic section between the first and second branches.

12. The rack as defined in claim 1, wherein the second branch is pivotable vertically relative to the trunk.

13. The rack as defined in claim 12, wherein the second branch is pivotally biased towards the first branch.

14. The rack as defined in claim 1, wherein the first branch includes a plurality of branch sections, each branch section including a substantially cylindrical main tube terminated at one end thereof by an axial sleeve and at an opposed end thereof by a sleeve receiving aperture, the main tubes each defining a branch passageway section extending between the sleeve and the sleeve receiving aperture, the sleeve of one of the branch sections being inserted in the sleeve receiving aperture of an adjacent one of the branch sections, each branch section also defining at least one of the top apertures leading into the branch passageway section.

15. The rack as defined in claim 14, wherein the sleeve is externally corrugated and the sleeve receiving aperture is complementarily internally corrugated such that adjacent branch sections are mountable to each other at discrete axial angular relationships relative to each other.

16. The rack as defined in claim 15, wherein the sleeve and the sleeve receiving aperture are frictionally engaged to each other.

17. The rack as defined in claim 14, wherein at least one of the branch sections includes a plate extending from the main tube, the at least one of the branch sections being mountable to adjacent ones of the branch sections so that the plate define a shelf.

18. The rack as defined in claim 14, wherein at least one of the branch sections includes an auxiliary tube extending from the main tube and delimiting the top aperture.

19. The rack as defined in claim 14, wherein at least one of the branch sections includes a utility section provided with apertures configured for holding tools.

20. The rack as defined in claim 14, further comprising a branch mounting bracket defining a mounting plate and a linking element, the linking element defining a first section receiving portion receiving a first one of the branch sections, a second section receiving portion receiving a second one of the branch sections, and a groove extending therebetween, the first and second branch sections each defining a respective ridge at a respective end of its respective main tube, the ridges being inserted in the groove, the sleeve of the first one of the branch sections being engaged in the sleeve receiving aperture of the second one of the branch sections.

21. The rack as defined in claim 14, further comprising a storage container mounted to a distalmost one of the branch sections, the storage container being axially mounted to the distalmost one of the branch sections and defining a proximal axial wall blocking separating the storage container from the branch passageway.

22. The rack as defined in claim 1, further comprising an auxiliary fluid drainage element, the auxiliary fluid drainage element including
   an elongated auxiliary branch having a proximal end thereof mounted to the trunk and an opposed distal end portion thereof extending radially distally therefrom at a predetermined drainage angle relative to the horizontal plane from the trunk, the auxiliary branch defining an auxiliary branch passageway extending longitudinally therealong and being in fluid communication with the trunk passageway; and
   at least one container drainage unit mounted to the auxiliary branch on an upper portion thereof the auxiliary branch, the at least one container drainage unit including an auxiliary funnel portion having an outlet end thereof in fluid communication with the auxiliary branch passageway, the at least one container drainage unit being configured and sized for receiving a motor oil filter.

23. The rack as defined in claim 1, wherein the substantially predetermined orientation is substantially vertical.

* * * * *